(12) United States Patent
Wan et al.

(10) Patent No.: US 8,906,990 B2
(45) Date of Patent: Dec. 9, 2014

(54) SURFACE TREATMENT AGENT FOR GALVANIZED STEEL SHEETS, GALVANIZED STEEL SHEETS AND PRODUCTION METHODS THEREOF

(76) Inventors: Frank Wan, Shanghai (CN); Jimmy Zhang, Jiangsu (CN); Kevin Meagher, Duesseldorf (DE)

( * ) Notice: Subject to any disclaimer, the term of this patent is extended or adjusted under 35 U.S.C. 154(b) by 217 days.

(21) Appl. No.: 13/169,568

(22) Filed: Jun. 27, 2011

(65) Prior Publication Data
US 2011/0281118 A1 Nov. 17, 2011

Related U.S. Application Data

(63) Continuation of application No. PCT/CN2009/075903, filed on Dec. 23, 2009.

(30) Foreign Application Priority Data

Dec. 26, 2008 (CN) .......................... 2008 1 0207880

(51) Int. Cl.

| | | |
|---|---|---|
| B01F 17/00 | (2006.01) |
| B32B 9/04 | (2006.01) |
| B32B 9/06 | (2006.01) |
| B32B 15/04 | (2006.01) |
| B32B 27/00 | (2006.01) |
| B32B 27/40 | (2006.01) |
| B60C 1/00 | (2006.01) |
| C08F 8/00 | (2006.01) |
| C08F 8/40 | (2006.01) |
| C08F 8/42 | (2006.01) |
| C08F 283/04 | (2006.01) |
| C08G 18/08 | (2006.01) |
| C08G 18/62 | (2006.01) |
| C08G 59/50 | (2006.01) |
| C08G 65/32 | (2006.01) |
| C08G 67/02 | (2006.01) |
| C08G 77/00 | (2006.01) |
| C08G 77/04 | (2006.01) |
| C08K 3/20 | (2006.01) |
| C08K 5/24 | (2006.01) |
| C08L 33/06 | (2006.01) |
| C08L 67/00 | (2006.01) |
| C08L 75/00 | (2006.01) |
| C08L 83/00 | (2006.01) |
| C08L 71/02 | (2006.01) |
| C08L 91/00 | (2006.01) |
| C09B 67/00 | (2006.01) |
| C09D 11/02 | (2014.01) |
| C09K 3/00 | (2006.01) |
| C23C 8/00 | (2006.01) |
| C23C 22/00 | (2006.01) |
| C23F 11/00 | (2006.01) |
| H01F 1/04 | (2006.01) |
| C23C 22/53 | (2006.01) |
| C09D 5/24 | (2006.01) |
| C09D 5/08 | (2006.01) |
| C23C 22/74 | (2006.01) |
| C08K 5/5419 | (2006.01) |

(52) U.S. Cl.
CPC ................. *C23C 22/74* (2013.01); *C23C 22/53* (2013.01); *C23C 2222/20* (2013.01); *C09D 5/24* (2013.01); *C08K 5/5419* (2013.01); *C09D 5/08* (2013.01)
USPC ........... 524/261; 148/113; 148/240; 148/243; 148/251; 252/387; 252/389.31; 428/423.1; 428/425.8; 428/447; 428/450; 523/400; 524/313; 524/560; 524/591; 524/601; 524/612; 524/839; 524/840; 525/100; 525/342; 525/403; 525/451; 525/453; 528/10; 528/25; 528/26.5; 528/33; 528/34; 528/41

(58) Field of Classification Search
USPC .................. 148/113, 240, 243, 251; 252/387, 252/389.31; 428/423.1, 425.8, 447, 450; 523/400; 524/313, 560, 591, 601, 612, 524/839, 840, 261; 528/10, 25, 26.5, 33, 528/34, 41; 525/100, 342, 403, 451, 453
See application file for complete search history.

(56) References Cited

U.S. PATENT DOCUMENTS

| 5,292,549 | A | 3/1994 | van Ooij et al. |
| 6,955,728 | B1 | 10/2005 | van Ooij et al. |

(Continued)

FOREIGN PATENT DOCUMENTS

| CN | 1299401 A | 6/2001 |
| CN | 1814860 A | 8/2006 |

(Continued)

OTHER PUBLICATIONS

Machine English translation of JP 2006-213958, En et al., Aug. 2006.*

(Continued)

*Primary Examiner* — Patrick Niland
(74) *Attorney, Agent, or Firm* — Mary K. Cameron

(57) ABSTRACT

Disclosed is a surface treatment agent for galvanized steel sheets, which comprises epoxy-containing silane derivates, alkyl-containing silane derivates, alkoxy silane derivates and one or more selected from the group consisting of a cationic polymer aqueous dispersion, a non-ionic polymer aqueous dispersion and a water-soluble polymer. Also disclosed is a method for producing it, which comprises mixing each component uniformly for 0.5 to 8 hours at 5 to 70° C. Further provided are galvanized steel sheets coated with the surface treatment agent on the surface and a production method thereof. The surface treatment agent for galvanized steel sheets has excellent corrosion resistance, alkali resistance, solvent resistance, recoating property, high temperature resistance and electrical conductivity.

18 Claims, No Drawings

(56) References Cited

U.S. PATENT DOCUMENTS

| | | |
|---|---|---|
| 2003/0049486 A1 | 3/2003 | Ooij et al. |
| 2005/0058843 A1 | 3/2005 | van Ooij et al. |

FOREIGN PATENT DOCUMENTS

| | | | |
|---|---|---|---|
| CN | 1887449 A | | 1/2007 |
| CN | 1887451 A | | 1/2007 |
| CN | 101228294 A | | 7/2008 |
| EP | 1153089 B1 | | 3/2007 |
| JP | 2003-105562 | * | 4/2003 |
| JP | 2006-213958 | * | 8/2006 |

OTHER PUBLICATIONS

Machine English translation of JP 2003-105562, Hasegawa et al., Apr. 2003.*

International Search Report from International Application No. PCT/CN2009/075903; 3 Pages; Dated Apr. 1, 2010.

* cited by examiner

SURFACE TREATMENT AGENT FOR GALVANIZED STEEL SHEETS, GALVANIZED STEEL SHEETS AND PRODUCTION METHODS THEREOF

CROSS-REFERENCE TO RELATED CASES

This application is a continuation under 35 U.S.C. 365(c) and 120 of International Application No. PCT/CN2009/075903, filed Dec. 23, 2009 and published on Jul. 1, 2010 as WO 2010/072152, which claims priority from Chinese Patent Application No. 200810207880.4, filed Dec. 26, 2008, which are incorporated herein by reference in their entirety.

TECHNICAL FIELD

The invention relates to surface treatment agent for galvanized steel sheets and production method thereof, galvanized steel sheets and production method thereof.

BACKGROUND ART

So as to prevent the surface of steel sheet from corrosion and expand its life, a zinc layer is usually coated to the surface of steel sheet. The steel sheet coated with zinc is called galvanized steel sheet.

Sometimes, a "post-plating surface treatment" needs to be consequently applied to the galvanized steel sheet that is just produced. The post-plating surface treatment prepares the surface for the subsequent forming or coating processes, and also provides a short-term protection of the galvanized steel sheet during subsequent handling process, storage and transportation. Currently, many surface treatment technologies have been used in industry, such as phosphorization, chromate treatment, oil coating, and their variants and combinations.

Chromate treatment began to be used in industry since 1930s, and it once became the most widely-used technology of the steel sheet surface treatment. Chromate treatment can provide a short-term protection from rust and corrosion. The process of chromate treatment is that, a solution of chromic acid, chromium salts and inorganic acid generate a thin conversion layer on the metal surface, the chemical reaction between metal and solution dissolution of metal, and leads to form a protective film of complex chromium and metal compounds. This method is of simple process, low cost and good corrosion resistance. However, the chromium compounds in the coating film, especially compounds of hexavalent chromium, are seriously harmful to human body and environment.

In order to seek an environmentally friendly technology, in recent years a variety of non-chromium organic or inorganic surface treatment technologies have been developed, such as inorganic conversion film system containing molybdenum, vanadium or zirconium, aqueous polymer dispersions-silica system and aqueous polymer dispersions-silicate system, etc.

At present, the introduction of silicon-containing organic-inorganic hybrid materials into the surface treatment of galvanized sheet is one of the hot issues in research. The silane has been used as anti-corrosion agent for metal surface for a long time, such as: in U.S. patent No. 20030049486A1, US20050058843A1 and EP 1153089B1, a composition of a vinyl silane and alkyl-silane was introduced to treat metal (mainly zinc) surface, while U.S. Pat. No. 6,955,728B1 treat the zinc surface by an treatment agent containing acyloxy silane.

CN1887449A and CN1887451A use a composition of silane, water-soluble polymers and vanadium compound as a surface treatment agent for galvanized steel sheet so as to realize the surface of the steel plate alkali resistant and solvent resistant. However, the anti-corrosion effect of these surface treatment agents is not satisfactory, or these agents contain toxic heavy metals; therefore, it's urgent to seek a new surface treatment agent for galvanized steel sheet which maintains the excellent corrosion resistance and are more environmentally friendly.

SUMMARY OF INVENTION

The object of the present invention is to overcome the disadvantage that the anti-corrosion effect of the existing surface treatment agent for galvanized steel sheets is not satisfactory and that the existing surface treatment agent contains toxic heavy metals. Thus, the present invention provides a surface treatment agent for galvanized steel sheets and production method thereof. This agent possesses a variety of excellent properties and no toxic heavy metals. The present invention also provides a galvanized steel sheet coated with the surface treatment agent and production method thereof.

DETAILED DESCRIPTION OF THE INVENTION

The present invention provide a surface treatment agent for galvanized steel sheets, comprising the followings components: A, an epoxy-containing silane derivative; B, an alkyl-containing silane derivative; C, an alkoxy silane derivative; and D, at least one substance selected from the group consisting of aqueous dispersion of cationic polymer, aqueous dispersion of non-ionic polymer and water-soluble polymer.

Component A: said epoxy-containing silane derivative is the silane compound which comprises at least one epoxy group in the molecular structure; preferably, is the compound shown as formula I; most preferably, is at least one compound selected from the group consisting of glycidoxypropyl methyl dimethoxysilane, glycidoxypropyl trimethoxysilane and glycidoxyethyl triacetylsilane. It is preferred, the content of said epoxy-containing silane derivative is 20-45 wt %, more preferably is 20-35 wt %, most preferably is 20-25 wt %; the percentage accounts for the total mass of A, B, C and D.

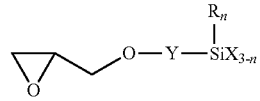

Formula I

Wherein, Y is $C_1$-$C_6$ alkylene; R is $C_1$-$C_6$ alkyl; X is $C_1$-$C_4$ alkoxy or $C_2$-$C_4$ acyloxy; n=0 or 1.

Component B: said alkyl-containing silane derivative is the silane compound which comprises at least one alkyl group in the molecular structure; preferably, is the compound shown as formula II and/or formula III; most preferably, is at least one compound selected from the group consisting of methyltrimethoxysilane, dimethyldimethoxysilane, methyltriethoxysilane and 1,2-bis(triethoxysilyl)ethane. It is preferred, the content of said alkyl-containing silane derivative is 15-45 wt %, more preferably is 15-35 wt %, most preferably is 15-25 wt %; the percentage accounts for the total mass of A, B, C and D.

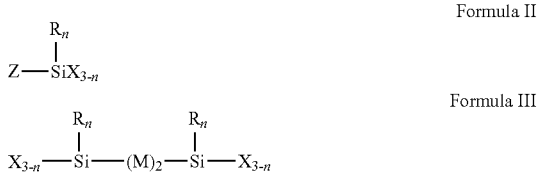

Formula II

Formula III

Wherein, R and Z is $C_1$-$C_6$ alkyl, respectively; M is $C_1$-$C_6$ alkylene; X is $C_1$-$C_4$ alkoxy or $C_2$-$C_4$ acyloxy; n=0 or 1.

Component C: said alkoxy silane derivative is silane compound which comprises at least one alkoxy group in the molecular structure; preferably, is the compound shown as formula IV; most preferably, is at least one compound selected from the group consisting of tetramethoxysilane, tetramethoxysilane and tetrapropoxysilane. It is preferred, the content of said alkoxy silane derivative is 5-30 wt %, more preferably is 5-20 wt %, most preferably is 5-10 wt %; the percentage accounts for the total mass of A, B, C and D.

$H_nSiX_{4-n}$    Formula IV

Wherein, X is $C_1$-$C_4$ alkoxy; n=0 or 1.

Component D: preferably, the aqueous dispersion of cationic polymer is at least one selected from the group consisting of aqueous dispersion of cationic polyurethane, aqueous dispersion of cationic acrylate, aqueous dispersion of cationic epoxy resin and aqueous dispersion of cationic alkyd; the aqueous dispersion of non-ionic polymer is at least one selected from the group consisting of aqueous dispersion of non-ionic polyurethane, aqueous dispersion of non-ionic acrylate, aqueous dispersion of non-ionic epoxy resin and aqueous dispersion of non-ionic alkyd; the water-soluble polymer is at least one selected from the group consisting of water-soluble polyethylene glycol, water-soluble polyacrylamide, water-soluble polyurethane and water-soluble polyacrylic acid.

The molecular weights of said aqueous dispersion of cationic polymer, aqueous dispersion of non-ionic polymer or water-soluble polymer have no influence on the effect of the surface treatment agent of the present invention. Thus, aqueous dispersions of cationic polymer, aqueous dispersions of non-ionic polymer or water-soluble polymers with diverse molecular weights can be used in the present invention.

It is preferred, the content of component D is 30-60 wt %, more preferably is 30-50 wt %, most preferably is 30-40 wt %; the percentage accounts for the total mass of A, B, C and D.

In the present invention, acidic compound and/or water can be added into the reactants.

Wherein, preferably, the acidic compound is organic acid or inorganic acid. Preferably, the inorganic acid is hydrochloric acid, sulfuric acid, nitric acid, phosphoric acid, hexafluorotitanic acid, fluorozirconic acid, fluosilicic acid or hydrofluoric acid. Preferably, the organic acid is acetic acid or hydroxyalkanesulfonic acid. It is preferred, the content of the acidic compound is 5-35 wt %; more preferably is 5-20 wt %, most preferably is 5-10 wt %; the percentage accounts for the total mass of A, B, C and D. Preferably, the content of water is 50-200 wt %, more preferably 100-200 wt %, most preferably 150-200 wt %; the percentage accounts for the total mass of A, B, C and D.

The surface treatment agent for galvanized steel sheets in this invention is homogeneous translucent substance, and its pH value is generally 2 to 7. It can also be adjusted to the appropriate pH value by pH adjusting agent.

The present invention also relates to production method of the composition in the present invention: mixing the foregoing components uniformly. The mixing temperature and mixing time are the common condition of this field, the optimum condition is: the mixing temperature is 5-70° C., usually under room temperature; the mixing time is 0.5-8 hours, more preferably is 1-3 hours. It's preferred, in order to mix uniformly, the mixing carries on in stirring condition.

The present invention further relates to a galvanized steel sheet whose surface is coated with the surface treatment agent of this invention for galvanized steel sheets. The coating amount of the surface treatment agent for galvanized steel sheets is preferred to be 0.5-2 mg/m². In the present invention, said galvanized steel sheet can be selected from all kinds of galvanized steel sheets in this field, such as electroplate galvanized steel sheet or hot dip galvanized steel sheets, etc.

The present invention further relates to production method of said galvanized steel sheet, comprising the steps: coating the surface of galvanized steel sheet with the surface treatment agent for galvanized steel sheets, wherein, film forming temperature is 60-120° C.

The reagent and raw material used in the present invention are all commercially available.

The advantageous effects of the present invention are that the surface agent for galvanized steel sheets in this invention doesn't contain toxic heavy metal and performs excellent corrosion resistance, alkali resistance, solvent resistance, high temperature resistance, electric conductivity and recoating properties.

EXAMPLES

Now illustrate the present invention further through the embodiments. However, the invention is not thus limited to the described embodiments.

The components of the surface treatment agent for galvanized steel sheets in examples 1 to 12 are: A, an epoxy-containing silane derivative; B, an alkyl-containing silane derivative; C, an alkoxy silane derivative; and D, at least one substance selected from the group consisting of aqueous dispersion of cationic polymer, aqueous dispersion of non-ionic polymer and water-soluble polymer. The content of each component is shown in Table 1.

Example 1

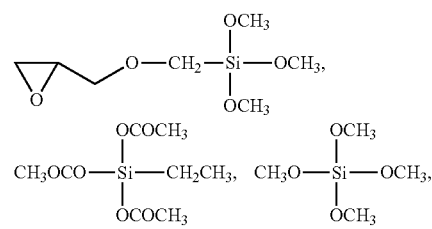

aqueous dispersion of cationic polyurethane.

According to the mixture ratio shown in table 1, mix the described components uniformly at 5° and adjust the pH value to 7 by pH adjusting agent (water solution of KOH or nitric acid). After 8 hours, the surface treatment agent for hot dip galvanized steel sheets is obtained.

Example 2

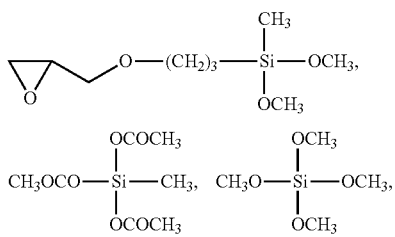

aqueous dispersion of nonionic polyurethane. acetic acid.

According to the mixture ratio shown in table 1, mix the described components uniformly at 10° and adjust the pH value to 6 by pH adjusting agent (water solution of KOH or nitric acid). After 3 hours, the surface treatment agent for galvanized steel sheets is obtained.

Example 3

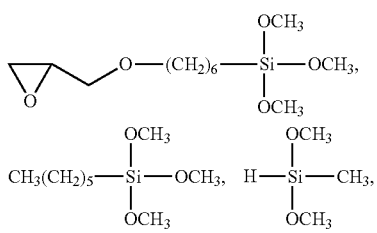

aqueous dispersion of cationic acrylate, water.

According to the mixture ratio shown in table 1, mix the described components uniformly at 20° and adjust the pH value to 5 by pH adjusting agent (water solution of KOH or nitric acid). After 2 hours, the surface treatment agent for galvanized steel sheets is obtained.

Example 4

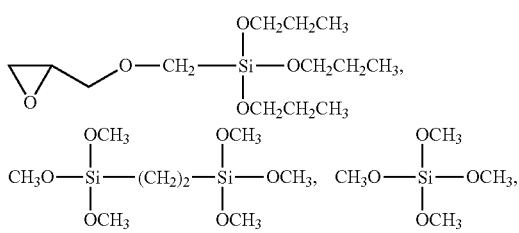

aqueous dispersion of cationic epoxy resin, sulfuric acid, water.

According to the mixture ratio shown in table 1, mix the described components uniformly at 40° and adjust the pH value to 3 by pH adjusting agent (water solution of KOH or nitric acid). After 1 hour, the surface treatment agent for galvanized steel sheets is obtained.

Example 5

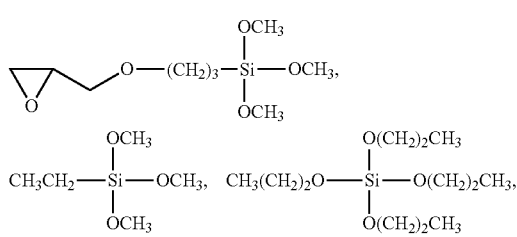

aqueous dispersion of non-ionic epoxy resin, nitric acid, water.

According to the mixture ratio shown in table 1, mix the described components uniformly at 25° and adjust the pH value to 2 by pH adjusting agent (water solution of KOH or nitric acid). After 0.5 hour, the surface treatment agent for galvanized steel sheets is obtained.

Example 6

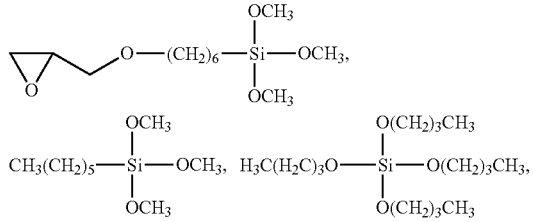

aqueous dispersion of cationic alkyd, phosphoric acid, water.

According to the mixture ratio shown in table 1, mix the described components uniformly at 50° and adjust the pH value to 4 by pH adjusting agent (water solution of KOH or nitric acid). After 2 hours, the surface treatment agent for galvanized steel sheets is obtained.

Example 7

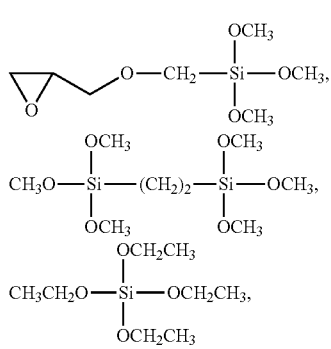

aqueous dispersion of non-ionic alkyd, hexafluorotitanic acid, water.

According to the mixture ratio shown in table 1, mix the described components uniformly at 15° and adjust the pH value to 3 by pH adjusting agent (water solution of KOH or nitric acid). After 1.5 hours, the surface treatment agent for galvanized steel sheets is obtained.

Example 8

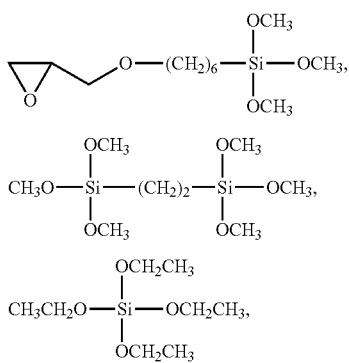

water-soluble polyethylene glycol, fluorozirconic acid, water.

According to the mixture ratio shown in table 1, mix the described components uniformly at 70° and adjust the pH value to 6 by pH adjusting agent (water solution of KOH or nitric acid). After 2 hours, the surface treatment agent for galvanized steel sheets is obtained.

Example 9

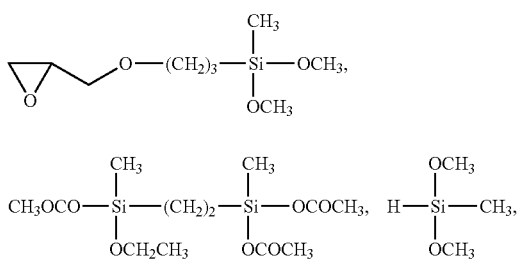

water-soluble polyacrylamide, fluosilicic acid, water.

According to the mixture ratio shown in table 1, mix the described components uniformly at 60° and adjust the pH value to 5 by pH adjusting agent (water solution of KOH or nitric acid). After 2 hours, the surface treatment agent for galvanized steel sheets is obtained.

Example 10

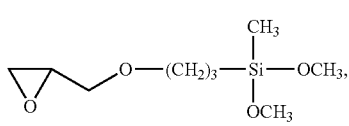

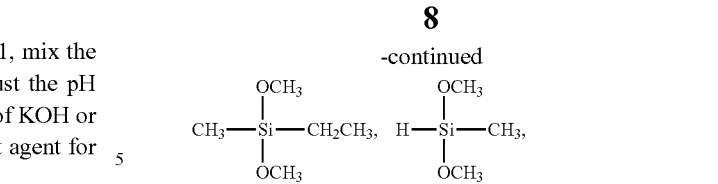

water-soluble polyurethane, hydrofluoric acid, water.

According to the mixture ratio shown in table 1, mix the described components uniformly at 25° C. and adjust the pH value to 3 by pH adjusting agent (water solution of KOH or nitric acid). After 1 hour, the surface treatment agent for galvanized steel sheets is obtained.

Example 11

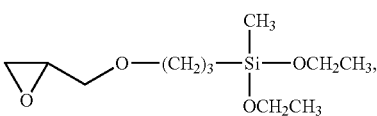

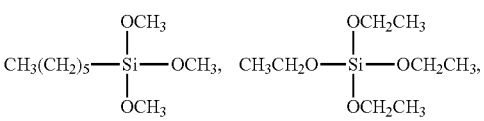

water-soluble polyacrylic acid, hydroxyalkanesulfonic acid, water.

According to the mixture ratio shown in table 1, mix the described components uniformly at 30° and adjust the pH value to 4 by pH adjusting agent (water solution of KOH or nitric acid). After 3 hours, the surface treatment agent for galvanized steel sheets is obtained.

Example 12

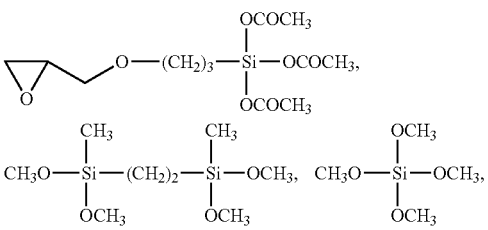

aqueous dispersion of non-ionic acrylate, hydroxyalkanesulfonic acid, water.

According to the mixture ratio shown in table 1, mix the described components uniformly at 25° and adjust the pH value to 4 by pH adjusting agent (water solution of KOH or nitric acid). After 3 hours, the surface treatment agent for galvanized steel sheets is obtained.

TABLE 1 the content of each component of examples 1 to 12

| Example | A, an epoxy-containing silane derivative/g | B, alkyl-containing silane derivative/g | C, alkoxy silane derivative/g | D, aqueous dispersion of cationic/nonionic polymer, or water-soluble polymer./g | acidic compounds/g | water/g |
|---|---|---|---|---|---|---|
| 1 | 20 | 45 | 5 | 30 | \ | \ |
| 2 | 45 | 15 | 10 | 30 | 5 | \ |
| 3 | 30 | 30 | 5 | 35 | \ | 50 |
| 4 | 20 | 20 | 15 | 45 | 20 | 150 |
| 5 | 25 | 15 | 30 | 30 | 30 | 200 |
| 6 | 40 | 15 | 5 | 40 | 35 | 120 |
| 7 | 35 | 25 | 10 | 30 | 15 | 80 |
| 8 | 20 | 30 | 20 | 30 | 25 | 60 |
| 9 | 20 | 15 | 15 | 50 | 20 | 180 |
| 10 | 20 | 20 | 5 | 55 | 8 | 100 |
| 11 | 25 | 20 | 25 | 30 | 12 | 120 |
| 12 | 15 | 15 | 5 | 65 | 5 | 100 |

Example 13

Dip or spray the galvanized steel sheet using weak alkaline degreasing cleaner of Henkel Ridoline 1559 which is commercially available (concentration: 10-20%; temperature: room temperature; cleaning time: 1-2 minutes). Rinse the galvanized steel sheet that has been washed with tap water. Dry the galvanized steel sheet in air to remove the residual water on the surface. Coat the surface of treated steel sheet with the surface treatment agent which is obtained in the example 10 by coating machine. The coating amount is 0.5 mg/m$^2$, and film forming temperature is 60°.

Example 14

Dip or spray the galvanized steel sheet using weak alkaline degreasing cleaner of Henkel Ridoline 1559 which is commercially available (concentration: 10-20%; temperature: room temperature; cleaning time: 1-2 minutes). Rinse the galvanized steel sheet that has been washed with tap water. Dry the galvanized steel sheet in air to remove the residual water on the surface. Coat the surface of treated steel sheet with the surface treatment agent which is obtained in the example 11 by coating machine. The coating amount is 1.5 mg/m$^2$, and film forming temperature is 90°.

Example 15

Dip or spray the galvanized steel sheet using weak alkaline degreasing cleaner of Henkel Ridoline 1559 which is commercially available (concentration: 10-20%; temperature: room temperature; cleaning time: 1-2 minutes). Rinse the galvanized steel sheet that has been washed with tap water. Dry the galvanized steel sheet in air to remove the residual water on the surface. Coat the surface of treated steel sheet with the surface treatment agent which is obtained in the example 12 by coating machine. The coating amount is 2 mg/m$^2$ and film forming temperature is 120°.

Effect Example

1. Base materials: Commercially available galvanized steel sheet (with no pre-treatment or only oiled treatment)
2. Base materials cleaning:
    (1) dip or spray base material using weak alkaline degreasing cleaner of Henkel Ridoline 1559 (concentration: 10-20% wt; temperature: room temperature; cleaning time: 1-2 minutes);
    (2) rinse the galvanized steel sheet that has been washed with tap water;
    (3) dry the galvanized steel sheet in air to remove residual water on the surface;
3. Coating:
Coat the surface of the treated steel sheet with surface treatment agents 1-4 which are prepared according to the formula in the following table as compared examples and with the surface treatment agent of the present invention, by coating bar or coating machine. The following percentage is weight percentage.

| | example | | | | |
|---|---|---|---|---|---|
| raw material | compared 1 | compared 2 | compared 3 | compared 4 | current invention |
| 3-glycidoxypropyl trimethoxy trimethoxysilane | 5% | 5% | \ | 5% | 7% |
| butyltrimethoxysilane | 5% | \ | 5% | \ | 6% |
| tetrapropyl orthosilicate | \ | 3% | 3% | \ | 4% |
| aminophenyltrimethoxysilane | \ | \ | \ | 5% | \ |
| aqueous dispersion of non-ionic polyurethane | 15% | 15% | 15% | 15% | 16% |
| hydroxyalkanesulfonic acid | 3% | 3% | 3% | 3% | 11% |
| Water | 72% | 74% | 74% | 72% | 56% |

Mix the above reactive substances well and stir at 25° for 30 minutes. After that, homogeneous material can be obtained.

4. Solidifying: control the peak metal temperature (PMT) within 80-120° C., thickness of dry film is 0.5-2 mg/m².

5. Testing:

(1) Corrosion resistance: measure the corrosion area of the sample according to the standard method ASTM B117-03 of the American Society for testing and materials.

(2) Alkaline resistance: at 50%, immerse the sample in Henkel Ridoline 336 for 2 minutes, visual inspect the surface of sample after washing.

(3) Solvent resistance: dip a cotton ball in 80% alcohol/methyl ethyl ketone (MEK), wipe the sample surface with 1 kg loading back and forth for 30 times by the dipped cotton ball, and measure the ΔE value of the sample before and after wiping.

(4) Electric conductivity: according to the IBM standard, test electric conductivity of the sample using the Mitsubishi Loresta MP-T360 conductivity meter and the BSP probe.

(5) High temperature resistance: place the sample into baking oven at 220° C. for 20 minutes, then take it out and measure the ΔE of value of sample before and after baking.

(6) Recoating properties: spray with powder (thickness is 20 μm), test the sample by mechanical tests such as cross cut test+erichsen test.

6. Testing results:

|  | testing result | | | | | |
|---|---|---|---|---|---|---|
| example | corrosion resistance (96 hr) | alkaline resistance | solvent resistance (ΔE) | electric conductivity (mΩ) | high temperature resistance (ΔE) | recoating properties |
| compared 1 | 80% | no discoloration, no stripping | 1.5 | 0.23 | 1.86 | 30% fall-off |
| compared 2 | 100% | no discoloration, no stripping | 0.8 | 0.24 | 0.90 | 40% fall-off |
| compared 3 | 20% | no discoloration, no stripping | 0.65 | 0.19 | 1.03 | 100% fall-off |
| compared 4 | 60% | no discoloration, no stripping | 2.20 | 0.22 | 2.13 | 30% fall-off |
| current invention | <3% | no discoloration, no stripping | 0.9 | 0.22 | 1.92 | no fall-off |

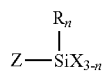

Formula II

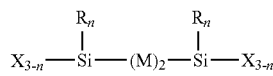

Formula III wherein, R and Z are each independently a $C_1$-$C_6$ alkyl respectively, M is a $C_1$-$C_6$ alkylene, X is a $C_1$-$C_4$ alkoxy or $C_2$-$C_4$ acyloxy, and n=0 or 1;

C. an alkoxy silane derivative having a structure as shown in formula IV:

$$H_nSiX_{(4-n)}$$ Formula IV wherein, X is a $C_1$-$C_4$ alkoxy and n is equal to 0 or 1; and D. at least one substance selected from the group consisting of an aqueous dispersion of cationic polymer, an aqueous dispersion of non-ionic polymer and a water-soluble polymer; and wherein component A is present in an amount of from 20 to 45 weight %, component B is present in an amount of from 15 to 45 weight %, component C is present in an amount of from 5 to 30 weight % and component D is present in an amount of from 30 to 60 weight % all based on the total combined weight of components A, B, C, and D.

As shown in the above table: comparing with the surface treatment agent 1 to 4 as compared examples, the surface treatment agent of the current invention has excellent corrosion resistance, alkaline, solvent resistance, conductivity, high temperature resistance and recoating properties.

The invention claimed is:

1. A surface treatment agent for galvanized steel sheets, which comprises the following components:

A. an epoxy-containing silane derivate having a structure as shown in formula I

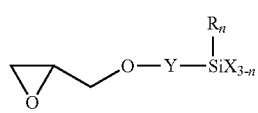

Formula I wherein, Y is a $C_1$-$C_6$ alkylene, R is a $C_1$-$C_6$ alkyl, X is a $C_1$-$C_4$ alkoxy or $C_2$-$C_4$ acyloxy, and n=0 or 1;

B. an alkyl-containing silane derivative having a structure as shown in formula II or formula III:

2. The surface treatment agent according to claim 1 wherein said epoxy-containing silane derivate is at least one compound selected from the group consisting of glycidoxypropyl methyl dimethoxysilane, glycidoxypropyl trimethoxysilane and glycidoxyethyl triacetylsilane.

3. The surface treatment agent according to claim 1 wherein said alkyl-containing silane derivative is at least one compound selected from the group consisting of methyltrimethoxysilane, dimethyl dimethoxysilane, methyltriethoxy silane and 1,2-bis(triethoxysilyl)ethane.

4. The surface treatment agent according to claim 1 wherein said alkoxy silane derivative is at least one compound selected from the group consisting of tetramethoxy silane, tetraethoxy silane and tetrapropoxy silane.

5. The surface treatment agent according to claim 1 wherein said aqueous dispersion of cationic polymer is at least one selected from the group consisting of an aqueous dispersion of cationic polyurethane, an aqueous dispersion of cationic acrylate, an aqueous dispersion of cationic epoxy resin and an aqueous dispersion of cationic alkyd;

said aqueous dispersion of non-ionic polymer is at least one selected from the group consisting of an aqueous dispersion of non-ionic polyurethane, an aqueous dispersion of non-ionic acrylate, an aqueous dispersion of non-ionic epoxy resin and an aqueous dispersion of non-ionic alkyd; and said water-soluble polymer is at least one selected from the group consisting of a water-soluble polyethylene glycol, a water-soluble polyacrylamide, a water-soluble polyurethane and a water-soluble polyacrylic acid.

6. The surface treatment agent according to claim 1 wherein said surface treatment agent contains an acidic compound and/or water.

7. The surface treatment agent according to claim 6 wherein said acidic compound is present in an amount of 5-35 weight % and said water is present in an amount of 5-200 weight %, all based on the total mass of A, B, C and D.

8. The surface treatment agent according to claim 6 wherein said acidic compound is at least one compound selected from the group consisting of hydrochloric acid, sulfuric acid, nitric acid, phosphoric acid, hexafluorotitanic acid, fluorozirconic acid, fluosilicic acid, hydrofluoric acid, acetic acid and hydroxy alkanesulfonic acid.

9. The surface treatment agent according to claim 1 having a pH value of 2 to 7.

10. A galvanized steel sheet having a surface comprising the surface treatment agent for galvanized steel sheets according to claim 1.

11. The surface treatment agent according to claim 1 wherein component A is an epoxy-containing silane derivative having the structure as shown in Formula I wherein X is a $C_1$ to $C_4$ alkoxy.

12. The surface treatment agent according to claim 1 wherein component A is an epoxy-containing silane derivative having the structure as shown in Formula I wherein X is a $C_2$ acyloxy.

13. The surface treatment agent according to claim 1 wherein component B is an alkyl-containing silane derivative having a structure as shown in Formula II wherein X is a $C_2$ acyloxy.

14. The surface treatment agent according to claim 1 wherein component B is an alkyl-containing silane derivative having a structure as shown in Formula II wherein X is a $C_1$ alkoxy.

15. The surface treatment agent according to claim 1 wherein component B is an alkyl-containing silane derivative having a structure as shown in Formula III wherein X is a $C_1$ alkoxy.

16. The surface treatment agent according to claim 1 wherein component B is an alkyl-containing silane derivative having a structure as shown in Formula III wherein X is a $C_2$ acyloxy.

17. The surface treatment agent according to claim 1 wherein component C is an alkoxy silane derivative wherein n equals 0.

18. The surface treatment agent according to claim 1 wherein component C is an alkoxy silane derivative wherein n equals 1.

* * * * *